United States Patent
Wu et al.

(10) Patent No.: US 9,051,880 B2
(45) Date of Patent: Jun. 9, 2015

(54) SYSTEM AND METHOD FOR COMPRESSED GAS FUEL HANDLING

(75) Inventors: Wenjie Wu, ShangHai (CN); Ping Yu, ShangHai (CN); Yuan Tian, ShangHai (CN); Zhiyong Chen, ShangHai (CN)

(73) Assignee: General Electric Company, Schenectady, NY (US)

( * ) Notice: Subject to any disclaimer, the term of this patent is extended or adjusted under 35 U.S.C. 154(b) by 933 days.

(21) Appl. No.: 13/236,510

(22) Filed: Sep. 19, 2011

(65) Prior Publication Data

US 2012/0204971 A1 Aug. 16, 2012

(30) Foreign Application Priority Data

Feb. 11, 2011 (CN) ...................... 2011 2 0088615 U

(51) Int. Cl.
| | |
|---|---|
| *G05D 23/13* | (2006.01) |
| *F02C 3/22* | (2006.01) |
| *F02C 3/28* | (2006.01) |
| *F02C 7/22* | (2006.01) |
| *F23K 5/00* | (2006.01) |

(52) U.S. Cl.
CPC ... *F02C 3/22* (2013.01); *F02C 3/28* (2013.01); *F02C 7/22* (2013.01); *F05D 2220/722* (2013.01); *F05D 2260/20* (2013.01); *F23K 5/007* (2013.01); *F23K 2401/10* (2013.01); *F23K 2401/201* (2013.01); *F23K 2900/05001* (2013.01); *Y02T 50/675* (2013.01); *Y02E 20/18* (2013.01); *Y02E 20/16* (2013.01)

(58) Field of Classification Search
CPC .............. F02C 3/22; F02C 7/22; F23K 5/007; F23K 2400/00; F23K 2401/10; F23K 2401/20; F23K 2401/201; Y02T 50/675
USPC ......... 60/39.464, 39.465, 734, 736, 780, 781; 62/617; 137/344, 343; 236/12.1, 12.13
See application file for complete search history.

(56) References Cited

U.S. PATENT DOCUMENTS

| | | | |
|---|---|---|---|
| 5,845,481 A | 12/1998 | Briesch et al. | |
| 6,167,692 B1 * | 1/2001 | Anand et al. ............... | 60/39.182 |
| 6,401,459 B1 | 6/2002 | Tiras | |
| 6,805,877 B2 * | 10/2004 | Massara et al. ............... | 424/430 |

* cited by examiner

*Primary Examiner* — Jonathan Bradford
(74) *Attorney, Agent, or Firm* — Fletcher Yoder P.C.

(57) ABSTRACT

A system includes a cooler configured to cool a first gas portion of a compressed gas fuel and discharge a cooled fluid. The cooled fluid comprises a cooled gas portion and a cooled liquid portion. The system also includes a separator configured to separate the cooled fluid into the cooled gas portion and the cooled liquid portion and a mixing tank configured to mix a second gas portion of the compressed gas fuel with the cooled gas portion in direct contact with one another to produce a superheated gas fuel. The superheated gas fuel comprises a degree of superheat above a lower threshold for a combustion system.

20 Claims, 4 Drawing Sheets

SYSTEM AND METHOD FOR COMPRESSED GAS FUEL HANDLING

CROSS-REFERENCE TO RELATED APPLICATION

This application claims priority to and the benefit of Chinese Patent Application No. 201120088615.6, entitled "SYSTEM AND METHOD FOR COMPRESSED GAS FUEL HANDLING," filed Feb. 11, 2011, which is herein incorporated by reference in its entirety.

BACKGROUND OF THE INVENTION

The subject matter disclosed herein relates to compressed gas fuel systems, and, more particularly, to temperature control in compressed gas fuel systems.

Turbine engines extract energy from a flow of fluid and convert the energy into useful work. For example, an integrated gasification combined cycle (IGCC) power plant includes one or more gas turbine engines that combust gas fuels, such as syngas or natural gas, to generate energy. The gas fuel is compressed in a gas fuel compressor prior to combustion in the gas turbine engine. Compression of the gas fuel generates heat, which may be removed in a cooler prior to combustion. However, existing compressed gas handling systems may be unable to meet a degree of superheat requirement for the gas turbine engine. In addition, existing systems may be costly and contribute to reduced efficiency of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a cooler configured to cool a first gas portion of a compressed gas fuel and discharge a cooled fluid. The cooled fluid comprises a cooled gas portion and a cooled liquid portion. The system also includes a separator configured to separate the cooled fluid into the cooled gas portion and the cooled liquid portion and a mixing tank configured to mix a second gas portion of the compressed gas fuel with the cooled gas portion in direct contact with one another to produce a superheated gas fuel. The superheated gas fuel comprises a degree of superheat above a lower threshold for a combustion system.

In a second embodiment, a system includes a first compressed gas fuel flow path configured to route a first gas portion of a compressed gas fuel. The system also includes a second compressed gas fuel flow path that separates from the first compressed gas fuel flow path and is configured to route a second gas portion of the compressed gas fuel. The system also includes a coolant flow path configured to route a coolant to cool the first gas portion of the compressed gas fuel. The system also includes a superheated gas fuel flow path configured to route a superheated gas fuel. The superheated gas fuel comprises at least a portion of the first gas portion of the compressed gas fuel and the second gas portion of the compressed gas fuel. The system also includes at least one flow control disposed in at least one of the first compressed gas fuel flow path, the second compressed gas fuel flow path, or the coolant flow path. The system also includes a superheat controller configured to adjust the at least one flow control to increase the degree of superheat of the superheated gas fuel if a sensed level of the degree of superheat of the superheated gas fuel is below a threshold level of the degree of superheat.

In a third embodiment, a method includes cooling a first gas portion of a compressed gas fuel in a cooler to produce a cooled fluid, wherein the cooled fluid comprises a cooled gas portion and a cooled liquid portion, separating the cooled fluid in a separator into the cooled gas portion and the cooled liquid portion, and mixing a second gas portion of the compressed gas fuel with the cooled gas portion in direct contact with one another in a mixing tank to produce a superheated gas fuel. The superheated gas fuel comprises a degree of superheat above a lower threshold for a combustion system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include systems directed toward handling of compressed gas fuels that are directed to a combustion system. More specifically, certain embodiments include a compressed gas fuel divided into a first gas portion and second gas portion. In such embodiments, a cooler is configured to cool the first gas portion of the compressed gas fuel and discharge a cooled fluid. As a result of the cooling of the first gas portion in the cooler, the cooled fluid may include a cooled gas portion and a cooled liquid portion. A separator is used to separate the cooled fluid into the cooled gas portion and the cooled liquid portion. Next, a mixing tank is used to mix the second gas portion of the compressed gas fuel with the cooled gas portion in direct contact with one another to produce a superheated gas fuel. As a result of this mixing, a temperature of the superheated gas fuel is greater than the temperature of the cooled gas portion, because a temperature of the second gas portion is greater than a temperature of the cooled gas portion. Thus, the superheated gas fuel may have a degree of superheat above a lower threshold for the combustion system. Advantageously, no additional, or external, heat is used to raise the degree of superheat of the superheated gas fuel above the lower threshold for the combustion system. Instead, the second gas portion, which does not flow through the cooler, is used to provide the heat necessary for the superheated gas fuel to attain or exceed the lower threshold. Thus, embodiments of the compressed gas handling system may be simpler and less expensive than existing compressed gas handling systems that use additional, or external, sources of heat, such as heaters.

Figure 1:
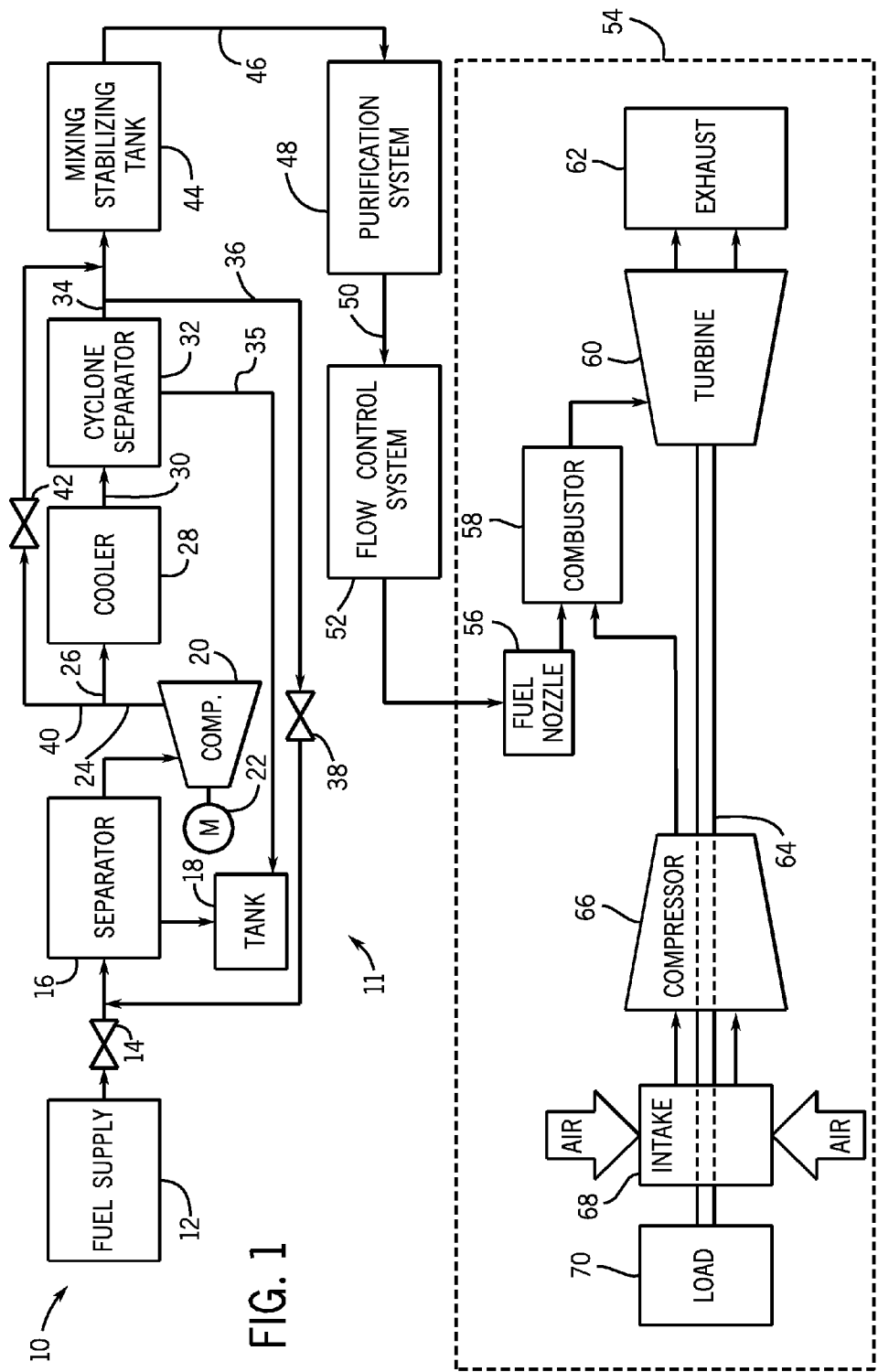
FIG. 1 is a block diagram of a compressed gas system incorporating a compressed gas handling system coupled to a turbine system according to an embodiment.

Turning now to the drawings, FIG. 1 is a diagram of an embodiment of a compressed gas system 10. As discussed in detail below, the compressed gas system 10 may include an embodiment of a compressed gas handling system 11 that includes a mixing tank configured to mix a portion of the compressed gas fuel with a cooled gas portion to produce a superheated gas fuel with a degree of superheat above a lower threshold degree of superheat for the combustion system. A fuel supply 12 includes any gaseous fuel that may be mixed with air and ignited to produce energy. An example of such a fuel 12 is syngas, which may be produced in a gasifier of an integrated gasification combined cycle (IGCC) power plant. Another example of the fuel 12 is natural gas. Next, a flow control system 14 may be used to control a flow rate of the fuel supply 12 and/or isolate the fuel supply 12 from the downstream portion of the compressed gas system 10. In various embodiments, the flow control system 14 may include one or more isolation valves, control valves, and/or flow meters. From the flow control system 14, the fuel supply 12 flows into a separator 16, which may be configured to separate the fuel supply 12 into liquid and gaseous portions. Although the fuel supply 12 may be entirely as a gas when generated, components of the fuel supply 12 may condense to form a liquid as the fuel supply 12 is transported to the compressed gas system 10. In certain embodiments, the separator 16 uses gravity to cause any liquid in the fuel supply 12 to settle toward the bottom of the separator 16, where the liquid may be withdrawn to a tank 18. The gaseous portion of the fuel supply 12 travels upward in the separator 16 at a velocity that minimizes entrainment of any liquid droplets. A demister pad may also be included near the top of the separator 16 to minimize entrainment of liquid droplets. For example, the demister pad, or mist eliminator, may include one or more blankets of metal wire or plastic knitted mesh to remove entrained liquid droplets from the gaseous portion of the fuel supply 12. In certain embodiments, the separator 16 may utilize cyclonic separation of the liquid and gaseous portions of the fuel supply 12. Such a cyclonic separator 16 may be capable of a separation efficiency greater than approximately 95 percent. The separator 16 may also include a flash drum, knock out drum, knock out pot, compressor suction drum, compressor inlet drum, and so forth.

The gaseous portion of the fuel supply 12 from the separator 16 then flows to a gas fuel compressor 20, which may include one or more stages to compress the fuel supply 12 into a compressed gas fuel 24 at a higher pressure. For example, a ratio of an inlet pressure of the fuel supply 12 to an outlet pressure of the compressed gas fuel 24 may be between approximately 35 to 45, 30 to 50, or 10 to 60. A motor 22 supplies motive power for the gas fuel compressor 20. In addition to being at a higher pressure than the inlet fuel supply 12, the compressed gas fuel 24 may be at a higher temperature than the inlet fuel supply 12. For example, a difference between a temperature of the compressed gas fuel 24 and a temperature of the fuel supply 12 may be between approximately 110 to 120 degrees Celsius, 105 to 125 degrees Celsius, or 90 to 140 degrees Celsius.

Next, the compressed gas fuel 24 may be divided into a first gas portion 26 and a second gas portion 40, which may be accomplished by using a split in the piping from the gas fuel compressor 20 or a similar flow-dividing device. The first gas portion 26 flows to a cooler 28, which cools the first gas portion 26 to generate a cooled fluid 30. The cooler 28 may be any type of heat exchanging device, such as a shell and tube heat exchanger. As a result of the cooling in the cooler 28, the cooled fluid 30 may include gaseous and liquid portions.

A cyclone separator 32 may be used to separate the cooled fluid 30 into a cooled gas portion 34 and a cooled liquid portion 35. The cyclone separator 32 may be configured similarly to the separator 16 using cyclonic separation as described in detail above. For example, the cyclone separator 32 may also have a separation efficiency greater than approximately 95 percent. In other embodiments, other separation technologies capable of similar separation efficiencies may be used instead of cyclonic separation. The cooled liquid portion 35 from the cyclone separator 32 may include water, tar, or lubrication oil, which may also be directed to the tank 18 for further processing. Such materials may be present in the fuel supply 12 or introduced by the gas fuel compressor 20 or elsewhere in the compressed gas system 10. A recycled portion 36 of the cooled gas portion 34 may be directed to upstream of the separator 16 along a recycle path to help control inlet conditions of the gas fuel compressor 20. A flow rate of the recycled portion 36 may be controlled by a recycle flow control system 38, which may include one or more isolation valves, control valves, and/or flow meters.

The second gas portion 40 of the compressed gas fuel may flow through a second portion flow control system 42, which is described in detail below. In other embodiments, the flow control system 42 may instead be used to control a flow rate of the first gas portion 26. The second gas portion 40 and the cooled gas portion 34 combine before flowing into a mixing stabilizing tank 44. In other embodiments, the second gas portion 40 may flow directly into the mixing stabilizing tank 44 separate from the cooled gas portion 34. In the mixing stabilizing tank 44, the second gas portion 40 and the cooled gas portion 34 come in direct contact with one another to produce a superheated gas fuel 46. For example, the mixing stabilizing tank 44 may include various internal devices, such as, but not limited to, baffles, nozzles, or any combination thereof, to improve mixing and contact of the second gas portion 40 and the cooled gas portion 34. In certain embodiments, a temperature of the second gas portion 40 may be greater than a temperature of the cooled gas portion 34. For example, a difference between the temperature of the second gas portion 40 and the cooled gas portion 34 may be between approximately 115 to 125 degrees Celsius, 110 to 130 degrees Celsius, or 95 to 145 degrees Celsius. A temperature of the superheated gas fuel 46 may be between approximately 65 to 75 degrees Celsius, 60 to 80 degrees Celsius, or 55 to 85 degrees Celsius. The superheated gas fuel 46 is referred to as superheated, because the temperature of the superheated gas fuel 46 is greater than a boiling point of the superheated gas fuel 46. In certain embodiments, the temperature of the superheated gas fuel 46 may be at least approximately 15 degrees Celsius, 25 degrees Celsius, or 35 degrees Celsius greater than the boiling point of the superheated gas fuel 46. Thus, the superheated gas fuel 46 does not include a liquid portion.

Next, the superheated gas fuel 46 may flow through a purification system, 48, which may be designed to remove solids and other particles from the superheated fuel gas 46. For example, the purification system 48 may include one or more filters configured to reduce the concentration of solids below approximately 1 mg per cubic meter. The purification system 48 may include more than one filter to enable online swapping between filters. Purified superheated gas fuel 50 may then flow to a flow control system 52, which may be configured to control a flow rate of the purified superheated gas fuel 50. The flow control system 52 may include one or more isolation valves, control valves, and/or flow meters. Next, the purified superheated gas fuel 50 may flow into a combustion system, such as a turbine system 54.

The turbine system 54 (e.g., a gas turbine engine) may employ one or more fuel nozzles 56. In certain embodiments, the turbine system 54 includes a plurality of fuel nozzles 56 arranged along a common plane or axially staggered relative to one another. For example, a plurality of fuel nozzles 56 (e.g., 2-10) may be arranged around a central fuel nozzle 56 in each combustor 58. The turbine system 54 uses the purified superheated gas fuel 50 to drive the turbine system 54. As depicted, one or more fuel nozzles 56 intake the purified superheated gas fuel 50, mix the gas fuel 50 with air, and distribute the air-fuel mixture into a combustor 58 in a suitable ratio for optimal combustion, emissions, fuel consumption, and power output. In certain embodiments, the turbine system 54 may include a plurality of combustors 58 arranged in an annular pattern, wherein each combustor 58 includes one or more fuel nozzles 56. The air-fuel mixture combusts in a chamber within the combustor 58, thereby creating hot pressurized exhaust gases. The combustor 58 directs the exhaust gases through a turbine 60 toward an exhaust outlet 62. As the exhaust gases pass through the turbine 60, the gases force turbine blades to rotate a shaft 64 along an axis of the turbine system 54. As illustrated, the shaft 64 may be connected to various components of the turbine system 54, including a compressor 66. The compressor 66 also includes blades coupled to the shaft 64. As the shaft 64 rotates, the blades within the compressor 66 also rotate, thereby compressing air from an air intake 68 through the compressor 66 and into the fuel nozzles 56 and/or combustor 58. The shaft 64 may also be connected to a load 70, which may be a vehicle or a stationary load, such as an electrical generator in a power plant or a propeller on an aircraft, for example. The load 70 may include any suitable device capable of being powered by the rotational output of the turbine system 54.

Figure 2:
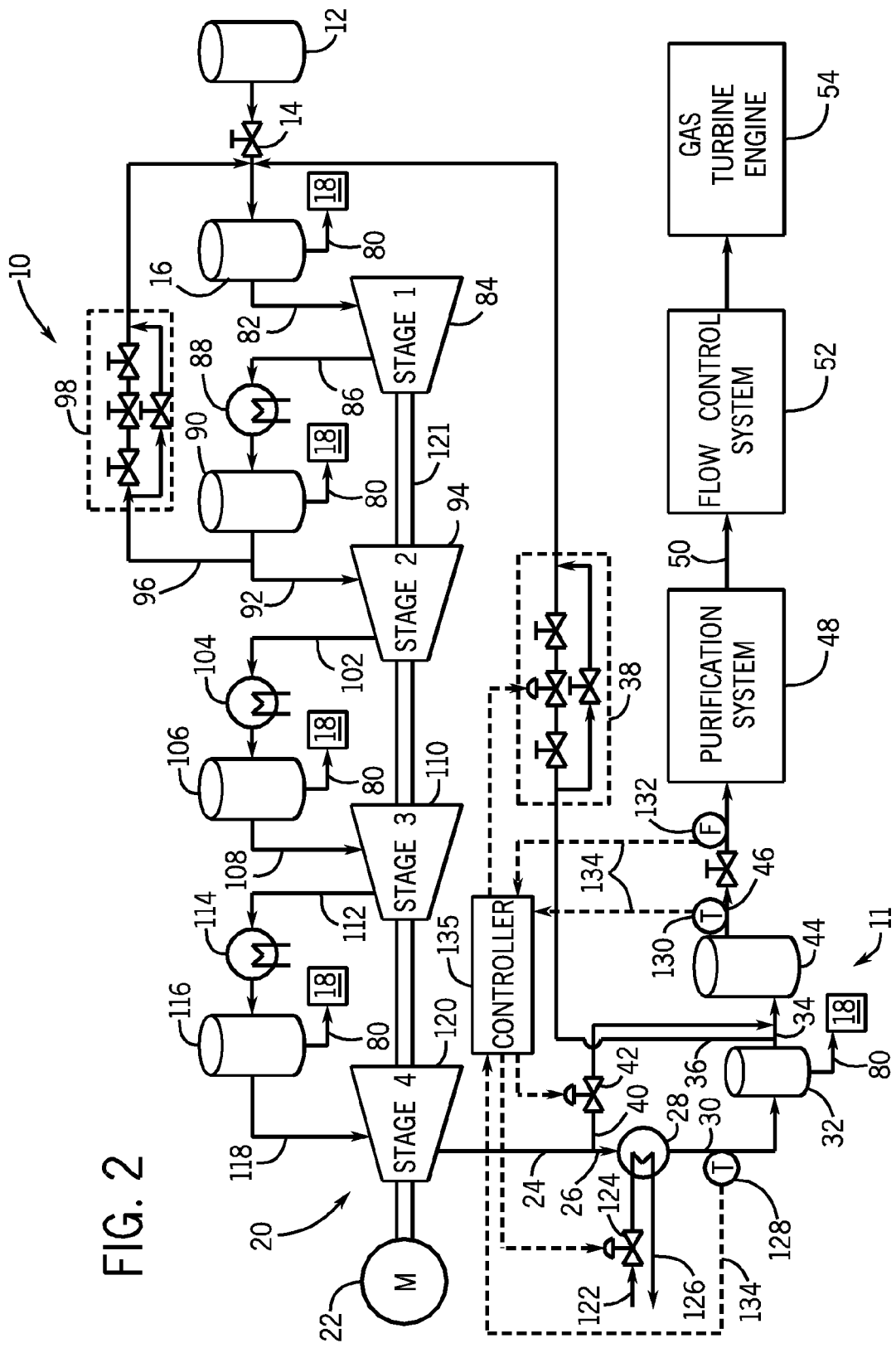
FIG. 2 is a block diagram of a compressed gas system incorporating a compressed gas handling system according to an embodiment.

FIG. 2 is a diagram of the compressed gas system 10 in which a control valve is used for the second portion flow control system 42. In addition, further details of the gas fuel compressor 20 are shown in FIG. 2. For example, in the illustrated embodiment, the fuel supply 12 originates from a storage tank instead of being supplied directly from a gasifier. Next, the separator 16 is shown separating the fuel supply 12 into a liquid portion 80 and a gaseous portion 82. The liquid portion 80 may be directed to the tank 18 for further processing. The gaseous portion 82, or first stage inlet gas, is directed to a first compressor stage 84 of the gas fuel compressor 20 to produce a first stage compressed outlet gas 86. A ratio of a pressure of the first stage compressed outlet gas 86 to a pressure of the first stage inlet gas 82 may be between approximately 2 to 3. The first stage compressed outlet gas 86 is then directed to a first stage cooler 88 to reduce a temperature of the first stage compressed outlet gas 86. After cooling, the first stage compressed outlet gas 86 passes to a second stage separator 90, which outputs liquid portion 80 and directs a second stage inlet gas 92 to a second compressor stage 94 of the gas fuel compressor 20. In addition, a second stage recycle gas 96 may be directed to upstream of the separator 16 to control inlet conditions of the gas fuel compressor 20. For example, a second stage recycle flow control system 98 may be used to control a flow rate of the second stage recycle gas 96. The second stage recycle flow control system 98 may include one or more isolation valves, control valves, and/or flow meters.

In the illustrated embodiment, the second compressor stage 94 generates a second stage compressed outlet gas 102. A ratio of a pressure of the second stage compressed outlet gas 102 to a pressure of the second stage inlet gas 92 may be between approximately 2 to 3. The second stage compressed outlet gas 102 is cooled in a second stage cooler 104 and then passes to a third stage separator 106, which outputs liquid 80 to the tank 18 and directs a third stage inlet gas 108 to a third compressor stage 110 of the gas fuel compressor 20. The third compressor stage 110 generates a third stage compressed outlet gas 112. A ratio of a pressure of the third stage compressed outlet gas 112 to a pressure of the third stage inlet gas 108 may be between approximately 2 to 3. The third stage compressed outlet gas 112 is directed to a fourth stage cooler 114 and then to a fourth stage separator 116, which may remove the liquid 80 to produce a fourth stage inlet gas 118. A fourth compressor stage 120 of the gas fuel compressor 20 compresses the fourth stage inlet gas 118 to produce the compressed gas fuel 24. A ratio of the pressure of the compressed gas fuel 24 to a pressure of the fourth stage inlet gas 118 may be between approximately 2 to 3. A gas fuel compressor shaft 121 connects the stages 84, 94, 110, and 120 of the gas fuel compressor 20. In other words, power from the motor 22 is transferred through the gas fuel compressor shaft 121 to the stages 84, 94, 110, and 120 of the gas fuel compressor 20.

In the illustrated embodiment, the first gas portion 26 is directed through the cooler 28 (e.g., a heat exchanger), which transfers heat from the first gas portion 26 to a coolant (e.g., water) to produce the cooled fluid 30. Accordingly, a cool coolant 122, such as water, passes through a coolant control valve 124, through the cooler 28, and exits from the cooler 28 as a warm coolant 126. A cooled fluid temperature sensor 128 may be disposed in the line downstream of the cooler 28 to sense a temperature of the cooled fluid 30. Moving next to the mixing stabilizing tank 44, a superheated gas fuel temperature sensor 130 may be disposed in the line downstream of the mixing stabilizing tank 44. In addition, a superheated gas fuel flow sensor 132 may also be disposed in the line downstream of the mixing stabilizing tank 44. The sensors 128, 130, and 132 may generate various input signals 134, which may be directed to a control system 135, which then generates output signals 134 directed to one or more control valves of the compressed gas system 10. The control system 135 may include one or more control systems, such as a temperature control system, a flow control system, and the like.

For example, in the illustrated embodiment, the signal 134 from the cooled fluid temperature sensor 128 may be used by the temperature control system 135 to adjust the coolant control valve 124. For example, if the temperature of the cooled fluid 30 exceeds a threshold, the coolant control valve 124 may open to increase the flow rate of the cool coolant 122 through the cooler 28, thereby decreasing the temperature of the cooled fluid 30. In addition, the superheated gas fuel temperature sensor 130 may be used by the temperature control system 135 to adjust the second portion flow control device 42, which may be disposed in either the first gas portion 26 or the second gas portion 40. In the illustrated embodiment, the second portion flow control device 42 is a control valve disposed in the second gas portion 40. Thus, the second portion flow control valve 42 is manipulated by the temperature control system 135 to adjust a ratio of the first gas portion 26 relative to the second gas portion 40. For example, if the temperature of the superheated gas fuel 46 is less than a threshold, the second portion flow control valve 42 may open to increase the flow rate of the second gas portion 40 directed to the mixing stabilizing tank 44, thereby increasing the temperature of the superheated gas fuel 46. The temperature of the superheated gas fuel 46 increases because the temperature of the second gas portion 40 is greater than the temperature of the cooled gas portion 34. In addition, the flow rate of the superheated gas fuel 46 may be used to adjust the recycle flow control device 38, which is illustrated as a control valve in FIG. 2. For example, if the flow rate of the superheated gas fuel 46 exceeds a threshold, the recycle flow control valve 38 may open to increase the flow rate of the recycle portion 36, thereby decreasing the flow rate of the superheated gas fuel 46. As shown in FIG. 2, no recycle cooler is disposed in the recycle path because the recycle portion 36 is essentially at the same temperature as the cooled fluid 30 cooled by the cooler 28. Other aspects of the compressed gas system 10 are similar to those described in detail above with respect to FIG. 1.

Figure 3:
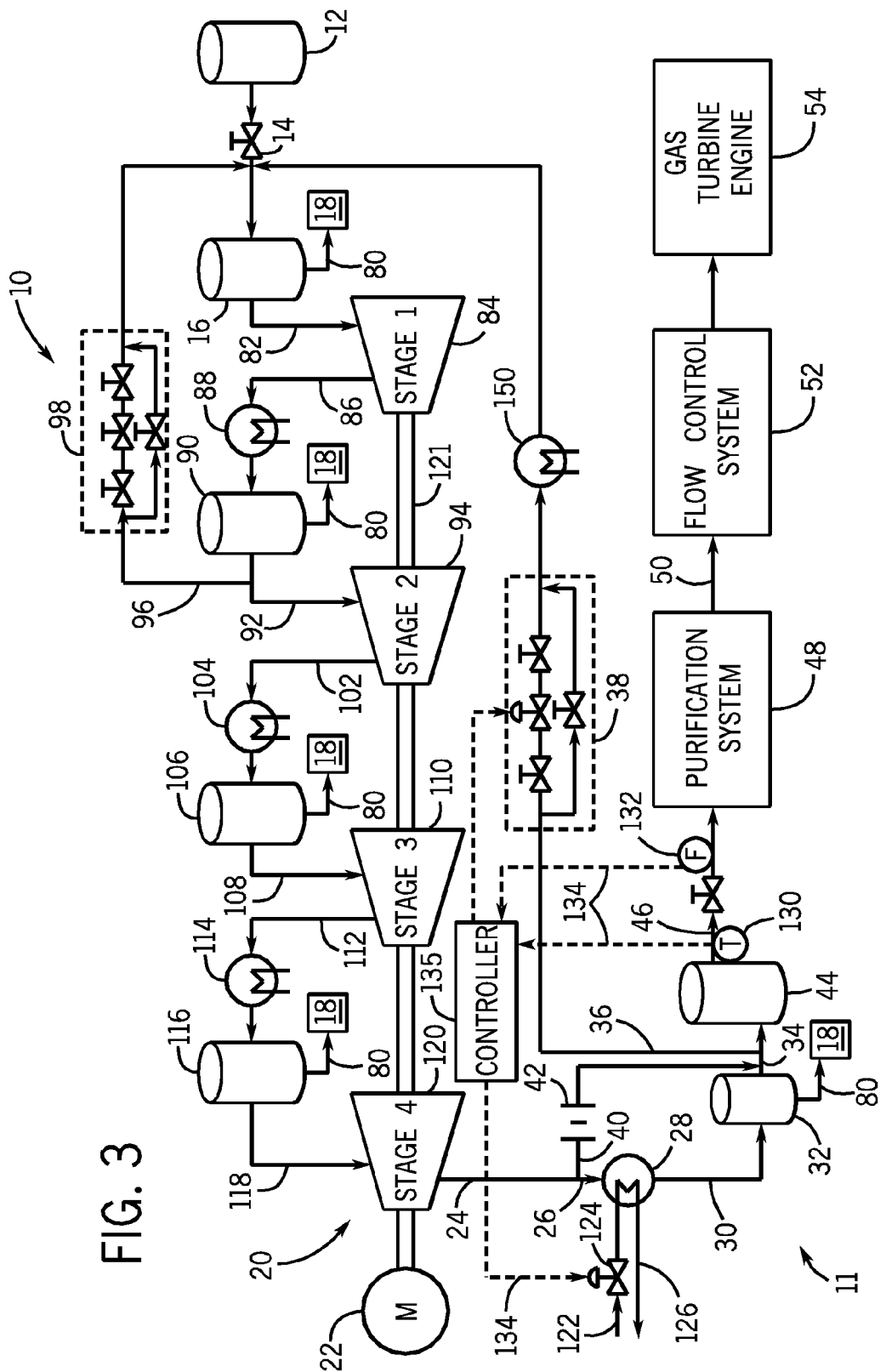
FIG. 3 is a block diagram of a compressed gas system incorporating a compressed gas handling system according to an embodiment.

FIG. 3 is a diagram of the compressed gas system 10 in which a restriction orifice is used for the second portion flow control device 42. The split between the first gas portion 26 and the second gas portion 40 is essentially fixed because the restriction orifice does not enable the flow rate of the second gas portion 40 to be adjusted during operation of the compressed gas system 10. In various embodiments, the flow rate of the second gas portion 40 is less than the flow rate of the first gas portion 26. For example, the flow rate of the second gas portion 40 may be less than approximately 50 percent, 40 percent, 30 percent, 20 percent, or 10 percent of the flow rate of the first gas rate portion 26. Thus, the second portion restriction orifice 42 may be sized appropriately to achieve the desired split between the first gas portion 26 and the second gas portion 40. In other embodiments, devices such as, but not limited to, a regulator, may be used instead of a restriction orifice or a control valve for the second portion flow control device 42.

In the illustrated embodiment, the second gas portion 40 mixes with the cooled gas portion 34 downstream of the cooler 32. The recycle portion 36 includes the mixture of the second gas portion 40 and the cooled gas portion 34. In certain embodiments, a recycle cooler 150 (e.g., a heat exchanger) may be disposed downstream of the recycle portion flow control device 38 to reduce the temperature of the recycle portion 36. The recycle cooler 150 is used because the recycle portion 36 is heated by mixing with the second gas portion 40, which is not cooled by the cooler 28. The recycle cooler 150 may use a coolant, such as water, similar to that used in the cooler 28 or any of the coolers 88, 104, or 114 of the gas fuel compressor 20.

The control scheme shown in FIG. 3 is different from that shown in FIG. 2 because of the use of the restriction orifice as the second portion flow control device 42. For example, the signal 134 from the superheated gas fuel temperature sensor 130 is used by the temperature control system 135 to adjust the coolant control valve 124. If the temperature of the superheated gas fuel is below a threshold, the temperature control system 135 may at least partially close the coolant control valve 124 to increase the temperature of the superheated gas fuel 46. Similarly, if the temperature of the superheated gas fuel is above a threshold, the temperature control system may at least partially open the coolant control valve 124 to decrease the temperature of the superheated gas fuel 46. In addition, the signal 134 from the superheated gas fuel flow sensor 132 is used by the temperature control system 135 to control the recycle flow control device 38. Other aspects of the compressed gas system 10 shown in FIG. 3 are similar to those discussed in detail above with respect to FIG. 2.

Figure 4:
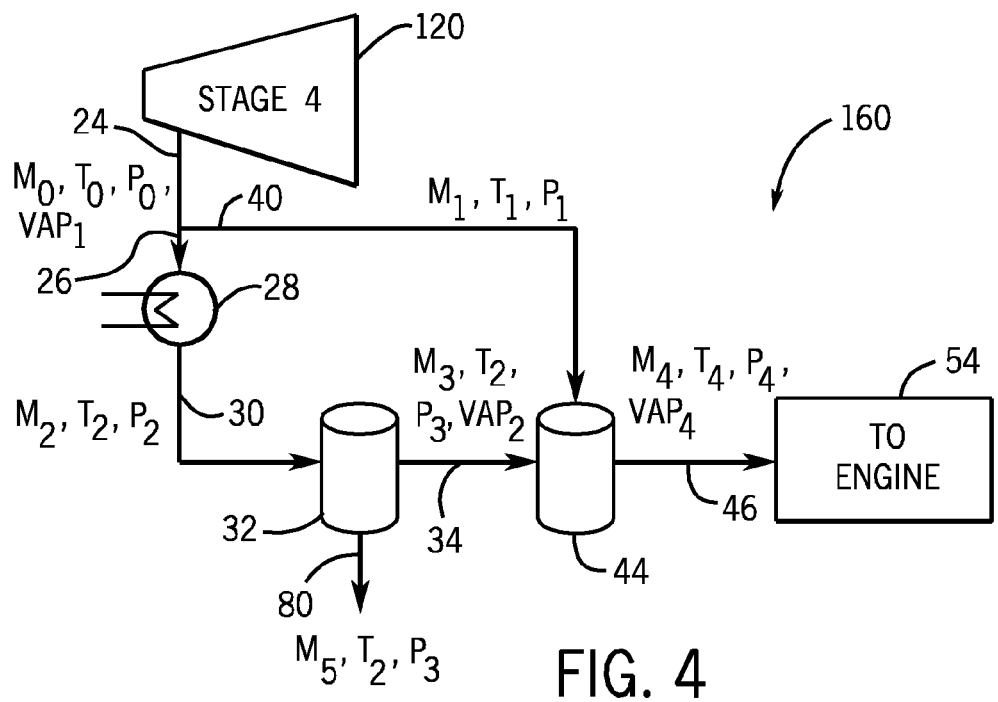
FIG. 4 is a block diagram of a compressed gas handling system according to an embodiment.

FIG. 4 illustrates the compressed gas handling system 160 of the compressed gas system 10. Specifically, FIG. 4 is used to illustrate one method for determining the split between the first gas portion 26 and the second gas portion 40 to enable the degree of superheat of the superheated gas fuel 46 to be above a lower threshold. The following equations illustrate an iterative method that may be used to determine the split between the first gas portion 26 and the second gas portion 40. First, a reheat ratio is calculated using the following equation:

$$\text{reheat ratio} = \frac{m_1}{m_1 + m_2} \quad \text{(EQUATION 1)}$$

where $m_1$ equals a flow rate of the second gas portion 40 and $m_2$ represents a flow rate of the first gas portion 26. For the first iteration, a value for the reheat ratio is assumed and for subsequent iterations, the reheat ratio is calculated using Eq. 1. Next, the flow rate $m_2$ of the first gas portion 26 is determined using the following equation:

$$m_2 = m_0 \times (1 - \text{reheat\_ratio}) \quad \text{(EQUATION 2)}$$

where $m_0$ represents the flow rate of the compressed gas fuel 26. Next, the fraction of the cooled gas portion 34 $\text{vap}_2$ may be calculated using the following equation:

$$\text{vap}_2 = \text{PSATT}(T_2)/P_3 \quad \text{(EQUATION 3)}$$

where $\text{PSATT}(T_2)$ represents the saturation pressure of the cooled gas portion 34 at temperature $T_2$, and $P_3$ represents the pressure of the cooled gas portion 34. Next, the fraction of the cooled liquid portion 80 $m_5$ is determined using the following equation:

$$m_5 = (vap_1 - vap_2) \times \frac{18}{\text{Mol. Wt}} \times m_2 \quad \text{(EQUATION 4)}$$

where $vap_1$ represents the vapor fraction of the compressed gas fuel 24, and Mol. Wt represents the molecular weight of the compressed gas fuel 24. Next, the flow rate of the cooled fluid 34 $m_3$ is determined using the following equation:

$$m_3 = m_2 - m_5 \quad \text{(EQUATION 5)}$$

Next, the flow rate of the superheated gas fuel 46 $m_4$ is determined using the following equation:

$$m_4 = m_0 - m_5 \quad \text{(EQUATION 6)}$$

The following equation represents a heat balance:

$$m_1 \times cp_1 \times (T_1 - T_4) = m_3 \times cp_3 \times (T_4 - T_2) \quad \text{(EQUATION 7)}$$

where $cp_1$ represents the heat capacity of the second gas portion 40, $T_1$ is the temperature of the second gas portion 40, $T_4$ is the temperature of the superheated gas fuel 46, and $cp_3$ represents the heat capacity of the cooled gas portion 34.

Next, the vapor fraction of the superheated gas fuel 46 vap$_4$ may be calculated using the following equations:

$$\text{vap}_4\_\text{mass }\% = \frac{m_3 \times vap_2 + m_1 \times vap_1}{m_4} \times 100\% \quad \text{(EQUATION 8)}$$

$$\text{vap}_4\_\text{mass }\% \to Vap_4 \quad \text{(EQUATION 9)}$$

Next, the dew point may be calculated using the equation:

$$\text{dew\_point} = \text{TSATP}(P_4 \times Vap_4) \quad \text{(EQUATION 10)}$$

where TSATP represents the saturation temperature of the superheated gas fuel 46. Next, the degree of superheat may be calculated using the following equation:

$$\text{superheat} = T_4 - \text{dew}_{\_point} \quad \text{(EQUATION 11)}$$

If the calculated degree of superheat is less than the lower threshold, the process is repeated until the degree of superheat exceeds the lower threshold. Then, the second portion flow control system 42 may be adjusted or configured to achieve the determined flow rates m$_1$ and m$_2$ of the second gas portion 40 and first gas portion 26 respectively. In certain embodiments, the degree of superheat threshold may be at least approximately 15 degrees Celsius, 25 degrees Celsius, or 35 degrees Celsius. The specific degree of superheat threshold may be based on the requirements for a particular gas turbine engine 54.

Figure 5:
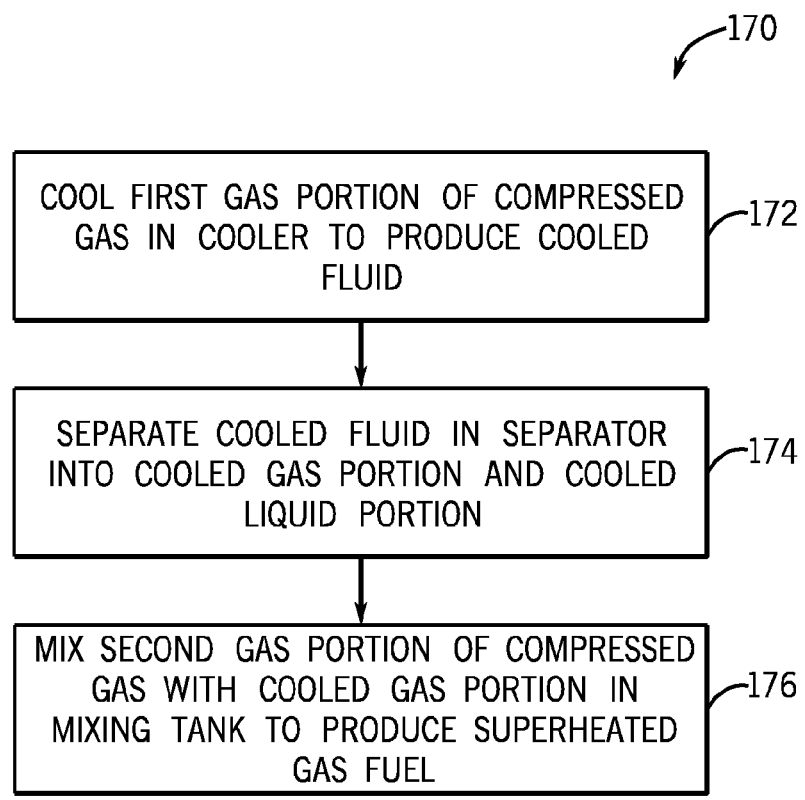
FIG. 5 is a flow chart of a process for handling a compressed gas according to an embodiment.

FIG. 5 is a flow chart of a process 170 that may be used to produce the superheated gas fuel 46 at the desired degree of superheat. The process 170 includes cooling a first gas portion of a compressed gas in a cooler to produce a cooled fluid (block 172). For example, the first gas portion 26 of the compressed gas fuel 24 is cooled in the cooler 28 to produce the cooled fluid 30. The process further includes separating the cooled fluid in a separator into a cooled gas portion and a cooled liquid portion (block 174). For example, the cooled fluid 30 is separated into the cooled gas portion 34 and the cooled liquid portion 80 by the cyclone separator 32. The process further includes mixing a second gas portion of the compressed gas with the cooled gas portion in a mixing tank to produce a superheated gas fuel (block 176). For example, the second gas portion 40 and the cooled gas portion 34 are mixed in the mixing stabilizing tank 44 to produce the superheated gas fuel 46. The desired degree of superheat for the superheated gas fuel 46 may be achieved by controlling the split between the first gas portion 26 and the second gas portion 40, or by controlling the flow rate of the cool coolant 122 through the cooler 28.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  a cooler configured to cool a first gas portion of a compressed gas fuel and discharge a cooled fluid, wherein the cooled fluid comprises a cooled gas portion and a cooled liquid portion;
  a separator configured to separate the cooled fluid into the cooled gas portion and the cooled liquid portion; and
  a mixing tank configured to mix a second gas portion of the compressed gas fuel with the cooled gas portion in direct contact with one another to produce a superheated gas fuel, wherein the superheated gas fuel comprises a degree of superheat above a lower threshold for a combustion system.

2. The system of claim 1, wherein the degree of superheat is at least approximately 25 degrees Celsius.

3. The system of claim 1, wherein a second flow rate of the second gas portion is less than a first flow rate of the first gas portion.

4. The system of claim 3, wherein the second flow rate of the second gas portion is less than approximately 20 percent of the first flow rate of the first gas portion.

5. The system of claim 1, comprising a temperature control system configured to maintain the degree of superheat of the superheated gas fuel above the lower threshold for the combustion system.

6. The system of claim 5, comprising at least one flow control disposed in at least one of a first flow path, a second flow path, or a coolant flow path, wherein the first flow path routes the first gas portion into the cooler, the second flow path routes the second gas portion into the mixing tank, and the coolant flow path routes a coolant to the cooler.

7. The system of claim 6, comprising a first flow control disposed in at least one of the first flow path or the second flow path, wherein the temperature control system adjusts a ratio of the first gas portion relative to the second gas portion by manipulating the first flow control to control the degree of superheat of the superheated gas fuel.

8. The system of claim 7, comprising a second flow control disposed in the coolant flow path, wherein the temperature control system adjusts a flow rate of the coolant to the cooler by manipulating the second flow control to control a temperature of the cooled fluid.

9. The system of claim 6, wherein the at least one flow control comprises:
  a restriction orifice disposed in the second flow path, wherein the restriction orifice is configured to restrict a flow rate of the second gas portion to the mixing tank; and
  a coolant flow control disposed in the coolant flow path, wherein the temperature control system adjusts a flow rate of the coolant to the cooler by manipulating the coolant flow control to control the degree of superheat of the superheated gas fuel.

10. The system of claim 9, comprising a recycle path configured to route a portion of the cooled gas portion to an inlet of a gas fuel compressor, wherein the recycle path comprises a recycle cooler.

11. The system of claim 1, wherein the separator comprises a cyclone separator.

12. The system of claim 1, comprising a compressor configured to supply the compressed gas fuel.

13. A system, comprising:
  a first compressed gas fuel flow path configured to route a first gas portion of a compressed gas fuel;
  a second compressed gas fuel flow path that separates from the first compressed gas fuel flow path and is configured to route a second gas portion of the compressed gas fuel;
  a coolant flow path configured to route a coolant to cool the first gas portion of the compressed gas fuel;
  a superheated gas fuel flow path configured to route a superheated gas fuel, wherein the superheated gas fuel comprises at least a portion of the first gas portion of the compressed gas fuel and the second gas portion of the compressed gas fuel;

at least one flow control disposed in at least one of the first compressed gas fuel flow path, the second compressed gas fuel flow path, or the coolant flow path; and a superheat controller configured to adjust the at least one flow control to increase the degree of superheat of the superheated gas fuel if a sensed level of the degree of superheat of the superheated gas fuel is below a threshold level of the degree of superheat.

14. The system of claim 13, comprising a cooler configured to cool the first gas portion of the compressed gas fuel and discharge a cooled fluid, wherein the cooled fluid comprises a cooled gas portion and a cooled liquid portion, and the coolant flow path routes the coolant to the cooler.

15. The system of claim 14, comprising a separator configured to separate the cooled fluid into the cooled gas portion and the cooled liquid portion.

16. The system of claim 15, comprising a mixing tank configured to mix the second gas portion of the compressed gas fuel with the cooled gas portion in direct contact with one another to produce the superheated gas fuel.

17. A method, comprising:

cooling a first gas portion of a compressed gas fuel in a cooler to produce a cooled fluid, wherein the cooled fluid comprises a cooled gas portion and a cooled liquid portion;

separating the cooled fluid in a separator into the cooled gas portion and the cooled liquid portion; and mixing a second gas portion of the compressed gas fuel with the cooled gas portion in direct contact with one another in a mixing tank to produce a superheated gas fuel, wherein the superheated gas fuel comprises a degree of superheat above a lower threshold for a combustion system.

18. The method of claim 17, comprising adjusting a flow rate of the second gas portion of the compressed gas fuel to control the degree of superheat of the superheated gas fuel.

19. The method of claim 17, comprising adjusting a flow rate of a coolant flowing through the cooler to control the degree of superheat of the superheated gas fuel.

20. The method of claim 17, comprising recycling a portion of the cooled gas portion to an inlet of a compression system that provides the compressed gas fuel.

* * * * *